F. N. CONNET.
VELOCITY EQUALIZING APPARATUS.
APPLICATION FILED MAY 16, 1912.
1,250,434.
Patented Dec. 18, 1917.
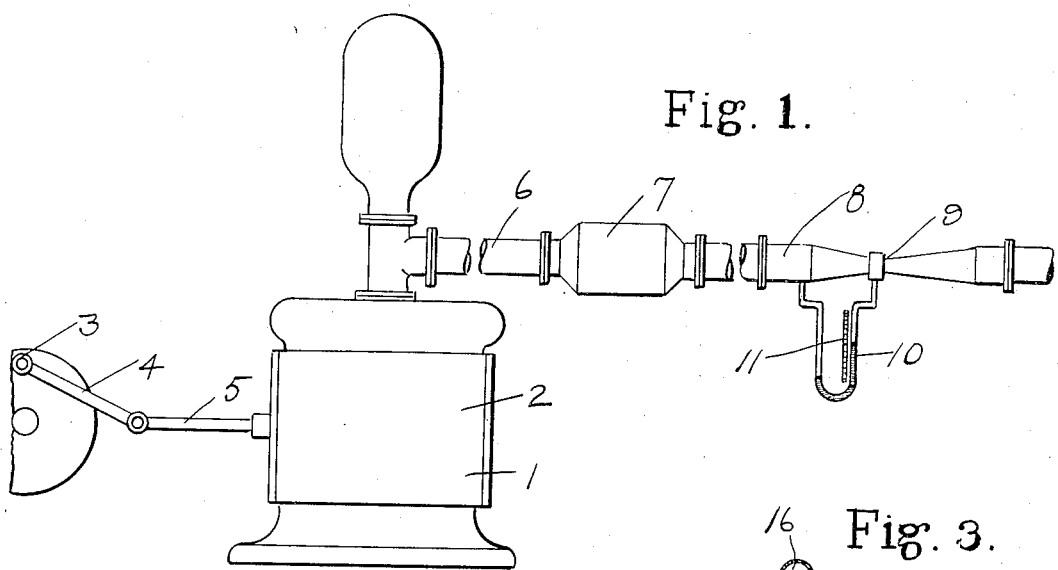
Fig. 1.
Fig. 3.
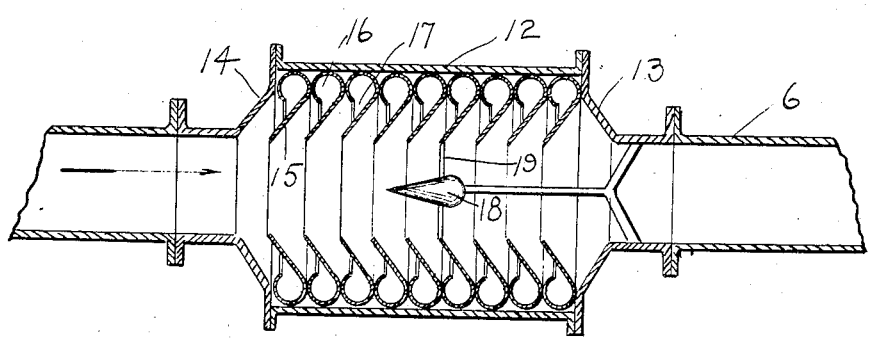
Fig. 2.
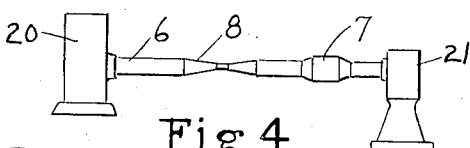
Fig. 4.
Witnesses
E. I. Ogden
J. L. Macdermott
Inventor
Frederick N. Connet.
By
Howard E. Barlow
Attorney

UNITED STATES PATENT OFFICE.

FREDERICK N. CONNET, OF PROVIDENCE, RHODE ISLAND.

VELOCITY-EQUALIZING APPARATUS.

1,250,434.  Specification of Letters Patent.  Patented Dec. 18, 1917.

Application filed May 16, 1912. Serial No. 697,676.

*To all whom it may concern:*

Be it known that I, FREDERICK N. CONNET, a citizen of the United States, and resident of Providence, in the county of Providence and State of Rhode Island, have invented a certain new and useful Improvement in Velocity-Equalizing Apparatus, of which the following is a specification.

This invention relates to a velocity equalizing and measuring apparatus for flowing gases, and has for its object to provide a device adapted to be connected to a line of pipe through which gases are impelled or caused to flow with an uneven velocity for the purpose of equalizing or correcting the uneven flow therethrough, said pipe line being also provided with a meter for measuring the flow, the equalizer being located between the velocity fluctuator, or cause of fluctuation, and the meter so as to render possible an accurate reading of the latter.

A further object of the invention is to construct the equalizer of a plurality of spaced apart hollow cone-shaped members each having an annular chamber near its outer edge whereby the outer stratum or layer of flowing gases may be temporarily deflected and also to provide a deflector at the core of the equalizer for directing the center of the flowing gases outwardly into the cone members to render them more effective in equalizing the flow.

With these and other objects in view, the invention consists of certain novel features of construction, as will be more fully described and particularly pointed out in the appended claims.

Of the accompanying drawings:

Figure 1— is a diagrammatic view illustrating a compressor for intermittently impelling gases through a line of pipe, said line having located therein a velocity equalizer and a meter.

Fig. 2— is an enlarged detail in section of my improved velocity equalizer.

Fig. 3— is a detail showing a sectional view of one of the cone-shaped blades employed in my equalizer.

Fig. 4— is a small diagrammatic view illustrating the reservoir or gas supply at one end of the pipe, the velocity fluctuator at the opposite or discharge end of the pipe and the equalizer located between the meter and the velocity fluctuator.

Referring to the drawing, 1 designates an ordinary reciprocating gas compresser having a cylinder 2 in which is located the usual piston which receives its motion from the crank 3, connecting rod 4, and piston rod 5, the gases being forced by each stroke of said piston out through the line of pipe 6 through the velocity equalizer 7 and through the meter 8. The meter preferably used for this purpose is of the Venturi type which comprises a tube having a contracted portion 9 to which is connected a gage or exhibitor 10, which as illustrated herewith comprises a U-tube partly filled with liquid and having a scale 11 which shows the cubic feet per minute or other desired unit of measure by which the flow through the tube is readily ascertained.

A feature of my invention is the construction of the equalizer, as illustrated in Fig. 2, which consists of a casing 12 having end plates 13 and 14 adapted to be connected to the line of pipe 6 and within this casing is mounted a series of hollow truncated cone-shaped members 15 spaced apart and with coincident axes, each having a portion projecting into the next preceding one, the outer diameter of each cone terminating in an annular chamber 16, the wall of which chamber is provided with an annular slot or opening 17 so that each time the gases receive an impulse and start to flow through at the maximum velocity, a portion of the outer layer, surface or stratum of the flowing body of gas is scraped off and is expanded or caused to spread outwardly and into the annular chamber 16, thus reducing the excess of the quantity flowing during that impulse, and after the particles of expanded gas have rotated in the manner of the well known "smoke rings" they leave the said chamber and return and rejoin the main stream during the time of minimum flow, thus serving to equalize the main flow and minimize the fluctuations as the stream moves through the Venturi tube.

In this manner it will be seen that inasmuch as the device takes care of the excess velocity above and below the average velocity, it therefore reduces the maximum velocity and increases the minimum velocity of the general mass of the irregularly flowing gases. Each successive cone tends to slightly reduce the degree of fluctuations of the velocity and when a large number of these cones is used the fluctuation will be reduced to such a point that a practical degree of accuracy in measuring the flow can be obtained with the Venturi meter tube, but nevertheless any finite number of cones will never reduce the fluctuations to absolute zero.

It is evident that the corrective effect will apply to the outer layers of gas to a greater degree than it will to the central portion thereof, and therefore I have provided a deflector, the same preferably comprising one or more comparatively small cone-shaped members 18, which may be inserted and supported in the core of the equalizer by the arms 19, or other suitable means, for the purpose of spreading or directing the central portion of the flowing gas outward to be engaged and expanded by the larger truncated cones. This will tend to give a uniform velocity throughout the cross section of the gas when it issues from the apparatus and passes on into the meter.

In Fig. 4, 20 designates a gas reservoir which supplies the gas to the pipe 6 to an internal combustion engine 21 at the opposite end of the line, the latter being the cause of a fluctuating flow of gases through the pipe.

I have shown a gas compresser in Fig. 1 which in this case is the cause of the fluctuation, as located near the entering end of the pipe line, but in some cases the velocity fluctuating device is attached to the outlet or discharge end of the line, as illustrated in Fig. 4, in which case it serves to draw the gases through the pipe intermittently. In any case I have found it of advantage in practice to place the velocity equalizer between the meter and the cause of fluctuation, so that the uneven velocity through the pipe may be reduced to such an extent that the meter may accurately measure the flow.

The word "gas" in the specification and claims is understood as including any compressible fluid.

I claim:

1. A velocity equalizer for fluid measuring apparatus comprising a casing inclosing a plurality of hollow truncated cone-shaped members each having an annular chamber near its outer edge, and means located at the core of the equalizer for deflecting the flow outwardly.

2. A velocity equalizer for fluid measuring apparatus comprising a casing inclosing a plurality of hollow truncated cone-shaped members each having an annular chamber near its outer edge, and a cone-shaped member located at the core of the equalizer for deflecting the flow outwardly.

In testimony whereof I affix my signature in presence of two witnesses.

FREDERICK N. CONNET.

Witnesses:
　HOWARD E. BARLOW,
　E. I. OGDEN.